April 2, 1935.  A. J. MASON  1,996,547
SEPARATOR AND METHOD
Filed May 27, 1933  2 Sheets-Sheet 1
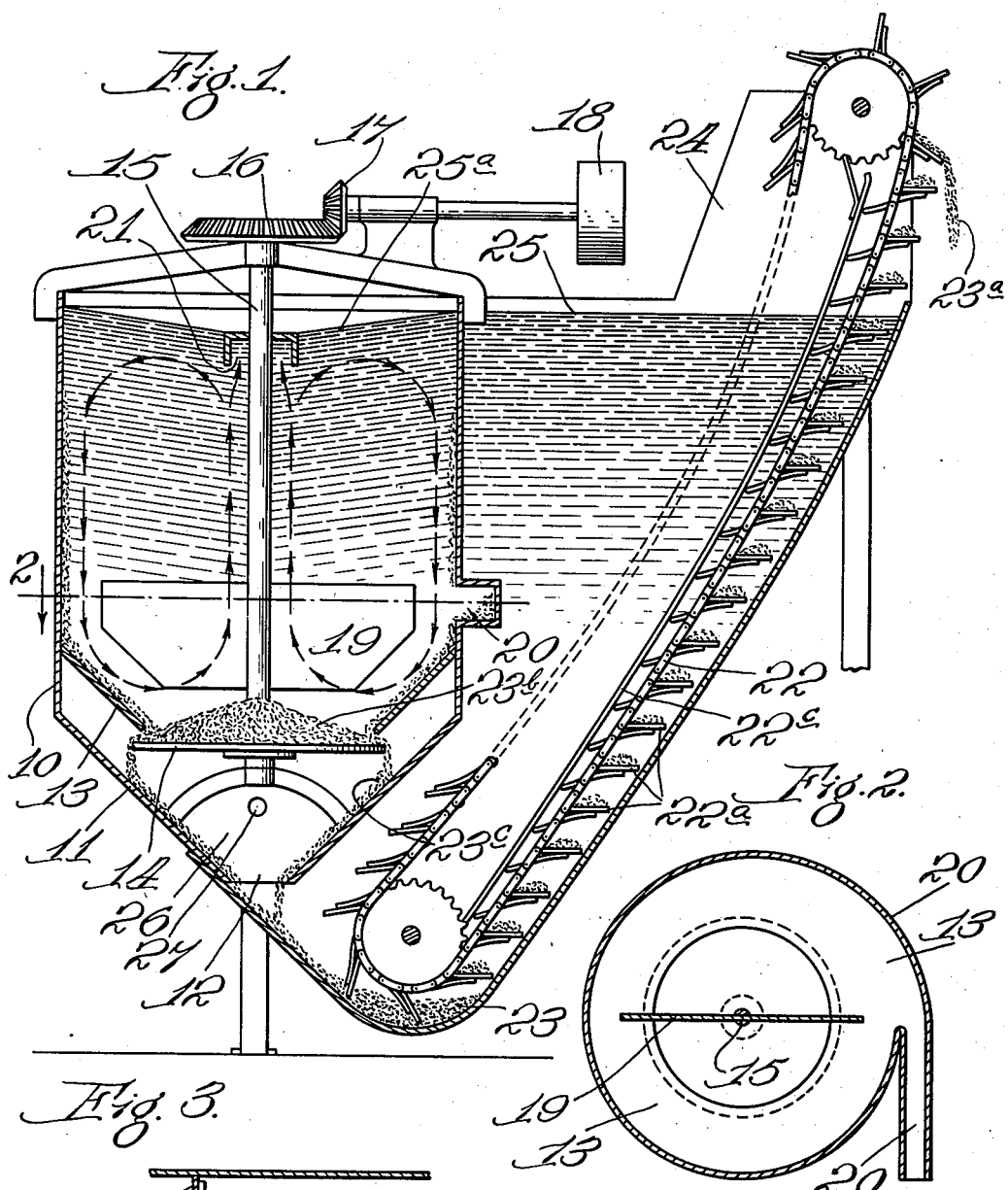

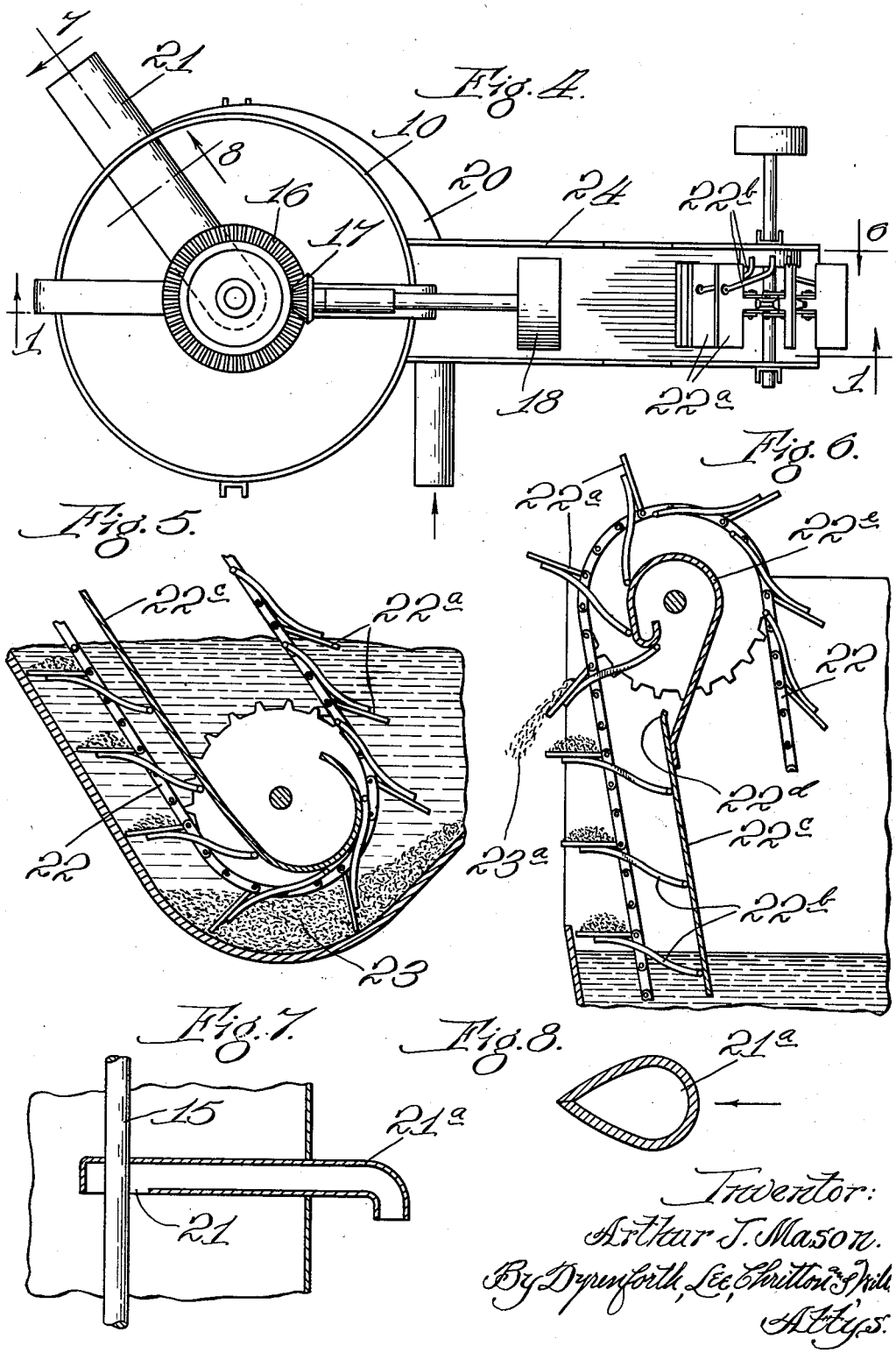

Patented Apr. 2, 1935

1,996,547

UNITED STATES PATENT OFFICE 1,996,547

SEPARATOR AND METHOD

Arthur J. Mason, Homewood, Ill.; Continental Illinois National Bank and Trust Company of Chicago executor of said Arthur J. Mason, deceased Application May 27, 1933, Serial No. 673,284

5 Claims. (Cl. 209—465)

This invention relates to improvements in a separator and method and, more especially, such an apparatus and method for improving the operation of retrieving fine granular material. My invention is applicable, for example, in the recovery, purification, and the like, of phosphate sands, bone phosphate of lime, and the like.

The practice of my invention simplifies the process, increases its efficiency and results in an economy of water.

Among the features of my invention is the provision of apparatus for setting up currents tending to effect a separation of the material to be recovered from the water or other liquid in which it is carried. It is to be understood, however, that other means for effecting such currents and the consequent separation may be employed.

Other features and advantages of my invention will appear more fully as I proceed with my specification.

In that form of device embodying the features of my invention shown in the accompanying drawings—

Figure 1 is a vertical sectional view taken as indicated by the line 1 of Fig. 4; Fig. 2 is a view taken as indicated by the line 2 of Fig. 1; Fig. 3 is a detail view of one of the shovels of the drag conveyor; Fig. 4 is a top plan view; Fig. 5 is a view in side elevation of the lower end of the conveyor; Fig. 6 is a similar view of the upper end of the conveyor; Fig. 7 is a view taken as indicated by the line 7 of Fig. 4; and Fig. 8 is a view taken as indicated by the line 8 of Fig. 4.

As shown in the drawings, the apparatus includes a cylindrical tank 10 with a conical hopper-like bottom 11 provided with a central discharge outlet 12.

Above the bottom 11 is a slanting circular deflecting plate or apron 13 adapted to direct solid material in its downward movement onto the circular disc 14 carried on the lower end of the vertical centrally arranged shaft 15 adapted to be rotated by the bevel gears 16 and 17 driven by the belt wheel 18. The shaft 15 carries the two diametrically arranged vertical paddles or vanes 19.

A tangentially arranged inlet pipe 20 is provided for the introduction of granular material and water. An outlet 21 (see Fig. 7) is provided for the escape of the rejected muddy water.

A drag conveyor is provided to remove the cleaned product. As here shown, this includes an endless chain 22 housed in a radial extension 24 on the tank 10 which is carried somewhat above the normal water level 25. The chain carries the pivotally mounted shovels or scoops $22^a$, each provided with an inwardly extending arm $22^b$, the end of which is adapted to engage a cam surface $22^c$ at the bottom. The cam surface $22^c$ (see Fig. 5) is shaped so that each of the shovels $22^a$, as it reaches the bottom of its travel, will be held in digging position. The shovels $22^a$ will therefore dig into the cleaned product 23 and carry the same to the upper end where it will be discharged, as indicated by $23^a$. The cam surface $22^c$ terminates at the upper end as indicated by $22^d$. Consequently, when the ends of the arms $22^b$ reach this point, the shovels $22^a$ are permitted to tilt and discharge the material, as indicated by $23^a$. At the upper end of the conveyor there is also provided another cam $22^e$ to right the shovels after they have been tilted and discharged their loads.

In the operation of the device, the apparatus is filled with water to the level 25. The shaft 15 is then rotated to give the paddles 19 a velocity suitable for the particular material being separated. For example, in washing the phosphate sands of Tennessee, I have found that the peripheral velocity of the ends of the paddles 19 should be about 400 feet a minute when the tank 10 is about 10 feet in diameter. When thus operated, I find that the particles below 150 mesh are discharged with the muddy water.

The mixture to be treated is introduced through the inlet pipe 20. I have found that one part solid material to five parts water will answer well, though these proportions may be changed. The rotating paddles cause the whole contents of the tank to rotate, forming the familiar eddy, wherein the liquid level at the center of the tank is somewhat depressed, as indicated by $25^a$. There is thus set up within the rotating mass of water internal radial currents due to the fact that the head of water is greater at the periphery than at the center. The currents radiating from the center flow downwardly along the vertical tank sides and return to the center adjacent the shaft 15 to make another upward rising column to discharge through the outlet 21.

There is thus created a localized central upward flow adapted to produce internal currents of material flowing radially outwardly above the paddles, thence downwardly adjacent the wall of the container, thence radially inwardly at the bottom, and thence upwardly at the center of the container.

I have suggested these currents by the arrows in Fig. 1. Owing to these currents, the heavier solid particles follow downwardly along the sides of the tank. The first effect is to build a cone of a certain steepness on the disc 14, as indicated by 23$^b$. The particles it is desired to save will then decline to follow with the water current and pass out through the annular opening along the margin of the revolving disc 14. These particles will escape, as indicated by 23$^c$, falling on the hopper-like bottom 11, and will then pass out through the outlet 12 where they will accumulate in the bottom of the apparatus, as indicated by 23. From this point they are picked up by the conveyor 22.

It is apparent that the velocity of the paddles and the diameter of the disc 14 will determine just what particles will remain with the water currents and be rejected and what particles will escape through the outlet 12. Increasing the velocity of the paddles will increase the velocity of the currents and consequently less of the fine particles will be saved. It must be further realized that the circular velocities of the water currents must greatly increase as they approach the center, just as they do in emptying the common washbowl with a central exit. It follows that any bottom exit in the center would fail of its purpose. Consequently, the escape of material, as indicated by 23$^c$, from the upper part of the tank 10 is through the annular orifice adjacent the periphery of the disc 14. From this orifice it falls into the lower chamber 26 and escapes therefrom through the central exit 12.

It is to be noted, also, that the outlet 21 for the tank 10 is centrally arranged at the top, since at this point the water is free from the particles that it is desired to save.

It is highly desirable that the surface at 25$^a$ should establish and constantly maintain a uniform contour of surface. A fresh supply of water may be introduced through the orifice 27 to maintain this contour as a certain amount of water will pass out with the drag conveyor. The stream of clean water introduced at 27 also keeps the secondary chamber 26 filled with relatively clean water and provides a gentle upward current of relatively clean water.

I have found that with an apparatus as shown, I can separate granular material down to 400 mesh, clean and free not only of the more or less colloidal matter but the material below 400 mesh which it is desirable to reject.

The outlet 21 leads into a discharge pipe 21$^a$ which is preferably made of a form in cross-section so as to create as little disturbance in the eddy currents as possible. For this reason, I prefer to make it of the form shown in Fig. 8, the direction of current being indicated by the arrow.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. The method of separating granular material, including; mixing the same with water; introducing said mixture into a substantially cylindrical body of liquid; whirling said body and mixture and creating a localized central upward flow adapted to produce internal currents of material in said body flowing radially outwardly, thence downwardly, thence radially inwardly, and thence upwardly at the center; centrally withdrawing cleaned material at the bottom of said body; and centrally withdrawing rejected water from the center of the top of said body of liquid at a point out of the course of said internal currents.

2. In a separator of the character described; a cylindrical chamber, with an inlet opening for introducing a mixture of granular material and water, and an outlet at the bottom for cleaned granular material; means for causing a circular motion of mixed water and granular material in said chamber in a horizontal plane; means for creating a localized central upward flow of mixed water and granular material in said chamber adapted to produce internal currents of material in said container flowing radially outwardly, thence downwardly thence radially inwardly, and thence upwardly at the center; and a discharge pipe with its inlet opening centrally arranged in the chamber slightly below the normal water level and out of the course of said local currents.

3. Apparatus as claimed in claim 2 in which the means for causing a circular motion of mixed water and granular material in said chamber in a horizontal plane includes a centrally arranged rotatable member with radially extending paddles a substantial distance below the inlet opening of said discharge pipe, said paddles having their outer ends lying close to the wall of said cylindrical chamber and their inner ends adjacent the axis of said rotatable member.

4. In a separator of the character described; a cylindrical chamber, with an inlet opening for introducing a mixture of granular material and water, and an outlet at the bottom for cleaned granular material; means for causing a circular motion of mixed water and granular material in said chamber in a horizontal plane; means for creating a localized central upward flow of mixed water and granular material in said chamber adapted to produce internal currents of material in said container flowing radially outwardly, thence downwardly, thence radially inwardly, and thence upwardly at the center; a rotatable horizontal disc near the bottom of the chamber, said disc adapted to temporarily collect granular material settling in said chamber; and a slanting deflector ring in the chamber above said disc, said ring adapted to direct material toward said disc.

5. In a separator of the character described; a cylindrical chamber, with an inlet opening for introducing a mixture of granular material and water, and an outlet at the bottom for cleaned granular material; means for causing a circular motion of mixed water and granular material in said chamber in a horizontal plane; means for creating a localized central upward flow of mixed water and granular material in said chamber adapted to produce internal currents of material in said container flowing radially outwardly, thence downwardly, thence radially inwardly, and thence upwardly at the center; a conical hopper-like bottom in the chamber with an outlet in the center thereof; a rotatable horizontal disc in the chamber above and near the bottom; and a slanting deflector ring in the chamber above the disc, said ring adapted to direct granular material toward said disc.

ARTHUR J. MASON.